United States Patent

[11] 3,615,715

[72] Inventor Joseph D. Mullen
 Golden Valley, Minn.
[21] Appl. No. 20,032
[22] Filed Mar. 16, 1970
[45] Patented Oct. 26, 1971
[73] Assignee General Mills, Inc.

[54] FILM FORMATION FROM NONHEAT COAGULABLE SIMPLE PROTEINS WITH FILLER AND RESULTING PRODUCT
 22 Claims, No Drawings

[52] U.S. Cl.................................................... 99/176,
 106/124, 106/149, 106/150, 106/154, 264/95,
 264/202, 264/204, 264/209
[51] Int. Cl........................................................A22c 13/00,
 B29d 23/06, C08h 1/00, D01f 9/04
[50] Field of Search........................................... 99/176,
 126; 106/137, 148, 149, 154, 161; 264/202, 209,
 204, 211, 216, 212, 202, 95

[56] References Cited
 UNITED STATES PATENTS
 3,123,653  3/1964  Lieberman................... 264/202
 3,329,509  7/1967  Julius............................ 99/176
 3,413,129  11/1968 Lieberman................... 264/209
 FOREIGN PATENTS
 652,949  11/1962  Canada......................... 264/202

*Primary Examiner*—Philip E. Anderson
*Attorneys*—Anthony A. Juettner and Gene O. Enockson ABSTRACT: Films are formed by extruding plastic masses containing particulate silica or silicate and derived from nonheat coagulable simple proteins. The films find value as edible packaging materials and in the form of casings are useful in sausage making and the like.

FILM FORMATION FROM NONHEAT COAGULABLE SIMPLE PROTEINS WITH FILLER AND RESULTING PRODUCT

The present invention relates to a process for preparing films including casings for sausages and the like. More particularly, it relates to a process for preparing such films and casings from certain protein containing compositions and particulate silica and silicates. It also relates to the resulting films and casings.

It has recently been discovered that nonheat coagulable simple proteins could be used to form plastic masses which could be extruded directly into a gaseous medium to form films including casings. Distinctly valuable proteins for this purpose are keratin and gluten and mixtures thereof with one or more other proteins.

These recent discoveries provide advantages to the art by setting forth practical procedures for forming films and casings from proteins which are edible and which have certain other desirable characteristics.

I have now discovered that these films and casings can be improved as well as the process of preparing same if a particulate silica or silicate is intimately blended with the constituents of the starting compositions. My invention provides many advantages including one or more of the following: (1) film and casing extrusion is smoother and more uniform; (2) bubbling due to vaporization of water at the die face is markedly reduced—probably the most significant advantage of this invention since weak spots due to bubbles are reduced to a considerable extent even to the point of elimination; (3) continuous film and casing production without pulsing is made possible; (4) extruder feed material is drier and flows with less caking; (5) production rate at a given extruder r.p.m. is increased, sometimes as much as two to three fold, and back pressures in the extruder barrel are cut substantially, for example from 800 p.s.i. to about 300 p.s.i.; (6) the extruded films and casings dry faster—i.e., drying time to 7 percent moisture may be reduced from 2 to 3 minutes down to 15-30 seconds; (7) the films and casings are more resistant to blocking—thus storage tests at 100° F. indicate that shirred casings without silica tend to block and then tear when they are unshirred during stuffing whereas silica containing casings do not exhibit blocking to any significant degree; and (8) the films and casings of the invention have improved heat sealing properties on commercial heat sealing machines—that is, there is less shrinkage along the edge of the seal.

My process accordingly involves the improvement of adding a particulate silica or silicate to the ingredients heretofore used in preparing extrudable protein containing plastic masses prior to the formation and extrusion of such plastic masses.

The basic ingredients of the plastic masses are a proteinaceous substance and a liquid. The weight ratio of protein to liquid (not including plasticizers if such are used) in the extrudable plastic masses in from about 1:4 to 6:1, dependent somewhat on the particular proteinaceous substance employed.

The primary or only constituent of the proteinaceous substance is a particulate nonheat coagulable simple protein source material having a protein content of at least about 65 percent by weight and preferably at least about 75 percent by weight. Simple proteins are defined at pages 30 and 31 of "Processed Plant Protein Foodstuffs" by Aaron M. Altschul, 1958, Academic Press Inc., 111 Fifth Avenue, New York, N.Y. The globulins, prolamines and scleroproteins are preferred for use in the present invention out of the general group of nonheat coagulable simple proteins. The properties of the films and casings will vary somewhat dependent on the particular simple protein or proteins used in the formation of the plastic masses. Thus, for example, the strength, extensibility of flexibility and nutritional value of the films and casings will vary with the selection of the starting particulate simple protein or proteins.

Various of the indicated protein source materials are commercially available or can be prepared by known procedures. Wheat gluten, for example, is obtained by separating it from wheat by any convenient means and the same is readily available commercially. Spray dried and flash dried wheat gluten are commercially available forms suitable for use in the invention. One preferred commercially available wheat gluten product is Pro-80, available from General Mills, Inc. This product is a flash dried vital wheat gluten which may contain several percent moisture and on a moisture-free basis is comprised of about 80 percent vital wheat gluten, 5-10 percent fat and 10-15 percent starch. It is preferred that the gluten source contains at least about 80 percent vital wheat gluten, with the remainder being diluent materials such as residual fat or lipid, starch, flour and the like. Wheat gluten source materials containing up to about 35 percent of diluent materials can be used provided that the overall protein to liquid ratio is obtained and the diluent materials do not render the dough unextrudable or adversely affect the desired properties of the edible films to an excessive extent.

The keratin protein useful in the present invention can be isolated from the natural sources thereof by various known procedures which preferably include the use of a reducing agent. The reducing agent appears to perform a variety of functions including increasing of the solubility or dispersibility of the keratin and/or improving the odor and/or flavor of the recovered isolate. When used during the initial isolation step, the reducing agent apparently increases the solubility or dispersibility of the keratin by breaking various disulfide bonds, both in the polypeptide chains (intrachain) and in the cross-linking of different polypeptide chains (interchain). When an alkali metal sulfide is used as the alkaline solubilizing agent, the keratin which is subsequently acid precipitated often has a bad odor indicating that hydrogen sulfide is being given off. Additionally, hydrogen sulfide may be given off during the precipitation step itself. In this instance, a reducing agent, such as an alkali metal sulfite appears to not only break some disulfide bonds but also to yield sulfurous acid which reacts with the hydrogen sulfide and any free sulfur formed during the sulfide solubilization or subsequent precipitation of the keratin. The products resulting from this reaction are theorized to be water soluble compounds such as $H_2S_2O_3$, $H_2S_3O_6$ and/or $H_2S_4O_6$. These compounds are not volatile and do not precipitate with the protein on addition of the acid precipitating agent.

One preferred procedure for isolating the keratin, as indicated above, comprises extracting same from the natural sources with an aqueous alkali metal sulfide solution, treating the resulting aqueous extract with an alkali metal sulfite and then precipitating the protein by the addition of an acid. The resulting product may also be dried if desired. This process can be used to recover keratin protein from any naturally occurring keratin source material, and is particularly valuable in the recovery of high quality keratin protein from feathers.

The first step of this preferred procedure is to extract the keratin source material with an aqueous solution of an alkali metal sulfide. Representative sulfides are sodium sulfide and potassium sulfide. Preferably the keratin source is in a relatively subdivided form to promote the extraction. For example, whole feathers can be extracted with the sulfide solution but better extraction is obtained if the feathers are cut into smaller pieces. The extraction is preferably carried out at temperatures of about 20° to 50° C. The alkali metal sulfide is preferably used in an amount of about 2.5 to 20 percent by weight based on the weight of the material being extracted. It is also preferred to use relatively dilute solutions of the alkali metal sulfide. In this way the extracted keratin protein is more readily dissolved in the extracting medium. Thus, the aqueous solutions preferably contain from about 0.25 to 2 percent by weight of the alkali metal sulfide and enough of the solution is used so that the concentration of the extracted keratin protein therein remains below about 15 percent by weight, and is preferably in the range of 1 to 10 percent by weight. Sodium sulfide ($Na_2S$) is the preferred extractant.

The protein containing solution is separated from the insoluble residue by conventional means such as decantation, filtration or the like. The insoluble residue can be further extracted or washed with water or fresh aqueous sulfide solution and the resulting liquids can be treated separately or combined with the first obtained protein containing solution. In this way, the ultimate yield of protein is increased somewhat although the major amount of the protein is normally obtained in the initial extraction step.

The protein containing solution is next treated with the alkali metal sulfite. Representative sulfites are sodium and potassium sulfite and bisulfite. A preferred treating agent is sodium sulfite ($Na_2SO_3$). The alkali metal bisulfites, such as sodium bisulfite ($NaHSO_3$), are less preferred since they release sulfur dioxide at a faster rate and thus may cause some localized premature precipitation unless added at a slower rate than the sodium sulfite. The sulfite is used in a molar excess in relation to the amount of alkali metal sulfide used in the initial extraction step. Preferably the molar ratio of the sulfite to the sulfide is in the range of 1.01–10.0:1.0. The sulfite in dry form or in the form of an aqueous solution thereof is simply added to the protein containing solution in the designated amount. The protein containing solution can be stirred during or after the addition to effect a more uniform distribution of the sulfite therein.

After the described sulfite treating step, the protein is precipitated by the addition of acid in the conventional manner. Any of a variety of inorganic or organic acids can be used. Representative acids are hydrochloric acid, sulfuric acid, acetic acid, phosphoric acid and the like. The acid is used in an amount sufficient to lower the pH of the protein containing solution to the isoelectric point or below of the protein. Preferably, the pH is reduced to below about 4.5 and the range of 3.0 to 4.5 is especially suitable.

The precipitated protein is separated from the protein barren liquid by conventional techniques—i.e., decantation, filtration and the like. In all of the steps of the process the temperature is not critical but is preferably in the range of 20° to 50° C.

The precipitated and separated protein can be dried if desired. Any conventional drying technique can be used—i.e., spray, drum, tray, freeze or the like. The resulting keratin protein is a high quality product having good odor, color and flavor characteristics.

Additional processes or procedures, other than the preferred one described above, may be used to isolate keratin in a form suitable for use in my invention. One such procedure involves digesting keratin source materials (e.g. poultry feathers) in an alcohol-water mixture which contains ammonium sulfite. In another satisfactory process for obtaining keratin suitable for use in my invention, keratin source materials are digested in a mercaptoethanol-alcohol-water mixture and filtered to remove impurities, and the keratin is obtained by centrifugation of the resulting gel mixture. In a further satisfactory process of obtaining keratin, the latter method is followed, except that the mercaptoethanol-alcohol-water mixture is made alkaline by the addition of a base such as sodium hydroxide, potassium hydroxide and the like. In these procedures for isolating keratin, the ammonium sulfite and mercaptoethanol reducing agents act primarily as aids for increasing the solubility of dispersibility of the keratin protein.

Other preferred nonheat coagulable simple proteins are available commercially. Thus particulate collagen is available, one suitable product being Avitene H microcrystalline collagen (available from FMC Corp.). Various isolates and concentrates derived from oilseeds, and particularly soybeans, are readily commercially available or prepared by known methods—i.e., alkaline extraction of defatted meals followed by acid precipitation. One such commercially available product is Promine R available from Central Soya, such product being soy isolate having a protein content of approximately 95 percent by weight. Leaf proteins are also available and can be prepared by known procedures similar to those used in isolating proteins from oilseed meals or flours. Various procedures are set forth in the above-referred to book "Processed Plant Protein Foodstuffs" at pages 54 and 55.

In general, it is theorized that upon extrusion of the plastic mass into the gaseous medium, various bonds are formed or reformed between the molecules of the proteins. Excessive diluent materials appear to inhibit the formation of such bonds and thus the proteinaceous substance should have a protein content of at least about 65 percent and preferably 80 percent and higher. Additionally, the protein should not be excessively denatured, either chemically or physically by heat, since denaturization also inhibits the formation or reformation of bonds between the protein molecules.

As indicated above, the proteinaceous substance is comprised mainly or solely of the described nonheat coagulable simple protein or proteins. However, it is possible and within the scope of the invention to use other proteins in combination with the nonheat coagulable simple protein or proteins to obtain certain properties. Thus, phosphoproteins (a member of the conjugated protein group) can be used, for example, to effect changes in the water solubility of the shaped articles. Such other proteins are used in an amount less than about 50 percent by weight of the total proteinaceous substance and preferably in an amount of less than about 30 percent by weight. The plastic masses may also contain extrusion aids such reducing agents and bases, alcohols, and and plasticizing agents.

The reducing agents and bases improve or optimize the extrudability of the nonheat coagulable simple protein containing plastic masses. It is theorized that the above agents improve the extrudability of the plastic masses by attacking various chemical forces in the proteins. The reducing agents are thought to aid in creating relatively homogeneous extrudable masses mainly by their action of cleaving disulfide bonds in the protein molecules or polypeptides thus increasing the dispersibility of the protein. It is also believed that such cleavage yields sulfhydryl groups on the proteins which later regenerate new bonds when exposed to the gaseous medium upon extrusion of the plastic mass. Accordingly, the incorporation of a reducing agent or agents in the compositions has the effect of temporarily cleaving various disulfide bonds of the protein or proteins such that more homogeneous extrudable plastic masses are formed but such that new disulfide bonds may regenerate upon extrusion to aid in forming strong, flexible films (including casings).

Any of a wide variety of reducing agents may be used in the formation of the extrudable plastic masses. Representative reducing agents are mercaptans such as mercaptoethanol, cysteine, cysteamine and the like, ascorbic acid, ammonium sulfite and the alkali metal sulfites, bisulfites, and nitrites such as sodium sulfite, sodium bisulfite and sodium nitrite. Especially preferred water soluble reducing agents are sodium sulfite and ammonium sulfite.

Other agents which find use as extrusion aids in forming the relatively homogeneous plastic masses include bases. Such basic substances are believed to aid in forming the extrudable masses by lessening or negating the effect of hydrogen bonding among polar groups in the protein polypeptides and/or lessening certain charge interactions of ionized residues in the protein which contribute to the protein's cohesive character. A wide variety of organic and inorganic bases may be used including amines, hydroxides, oxides, basic salts and the like. The preferred bases are the water soluble hydroxides, and especially the alkali metal hydroxides—i.e., sodium and potassium hydroxide—and ammonium hydroxide. Ammonium hydroxide is the preferred base due to its volatility which encourages more immediate drying of the freshly extruded products. Its use also eliminates the necessity of a neutralization step to obtain a product of near neutral pH.

It is preferred to include an extrusion aid in the extrudable compositions. As such the same is used in an amount sufficient to aid in the formation of a relatively homogeneous extrudable plastic mass from the protein and liquid. In this respect, the optimum amount will vary somewhat depending on whether the extrusion aid is a reducing agent or a base or both and also as to the precise such agent used. The reducing agent will preferably be used in an amount of about 0.1 to 5.0 percent by weight based on the weight of the protein. The base will preferably be used in an amount of about 0.1 to 45 percent by weight based on the weight of the protein. As indicated above sodium sulfite is a preferred reducing agent and is preferably used in an amount of about 0.1 to 2.0 percent by weight based on the weight of the protein. The preferred base is ammonium hydroxide as indicated above. It is especially preferred to use a combination of the above two extrusion aids in the preparation of the films.

Monohydroxy aliphatic alcohols may also be included in the extrudable mixtures. When used in combination with the above-described extrusion aids, such alcohols also aid in the dispersing of the protein in the plastic masses presumably by lessening the effect of hydrophobic bonding among nonpolar residues in the protein. The alcohols contain less than about 10 carbon atoms and preferably contain 1 to 4 carbon atoms. Illustrative of the preferred alcohols are methanol, ethanol, isopropanol, propanol, n-butanol and the like. While alcohols containing more than five carbon atoms may be used, they are not preferred since they tend to cause the need for higher temperatures to form a plastic mass which is homogeneous, nonwaxy and suitable for extrusion. Ethanol is an especially preferred alcohol for use. The alcohol can be used to replace up to about 95 percent by volume of the water in the liquid portion of the extrudable compositions.

Certain ingredients may be included in the extrudable compositions which impart increased flexibility to the extruded films. Such ingredients may be termed "plasticizers," and include a variety of polyols and higher molecular weight alcohols such as glycerol, propylene glycol, diglycerol, polyethylene glycols, 1,2,6-hexanetriol, triethanolamine, and the like. Where food applications are sought for products prepared in accordance with this invention, plasticizers should not be used which would impart undesirable odor or taste to the products. Preferred plasticiziers comprise gylcerol, diglycerol, propylene glycol and 1,2,6-hexanetriol. For example, glycerol has been used in amounts up to about 50 percent of the weight of the protein, although amounts up to about 33 percent are preferred.

When no plasticizer is included in the compositions, initially flexible and expansible films may be extruded. However, such films tend to become somewhat brittle upon drying. Thus where it is desired to form films which will retain their flexibility, it is necessary either to include a plasticizer in the extrudable plastic mass or to subject the extruded film to a plasticizing treatment. Where a plasticizer is included in the extrudable composition, enough should be used that the desired flexibility is attained. Thus where a plasticizer is included, it is preferred that the weight ratio of protein to plasticizer be about 5:1 to 2:1.

When desired flexibility in the extruded film is achieved by subjecting the same to a plasticizing treatment, means serving to bring the plasticizer in contact with the film will serve this result. For example, a solution of about 10 to 80 percent by weight glycerol in water or up to 95 percent ethanol provides a suitable plasticizing bath to which the extruded film may be subjected.

Still further variations of the present invention include the use of other modifying agents and additives. One such modifying agent is citric acid which tends to improve the wet strength of the films.

As set forth above, I have now discovered that the addition of a particulate silica or silicate to the other constituents or ingredients used in preparing the extrudable plastic masses provides improvements in the overall process and in the resulting films. The silica or silicate can be used in an amount of from about 0.5 to 30 percent by weight based on the weight of the protein with an amount of from about 1.0 to 15.0 percent by weight being preferred.

A wide variety of particulate silicas and silicates can be used in the present invention and are available commercially. The preferred such agents are the fumed silicas. Representative of these products are Cab-O-Sils of the following grades: EH-5, H-5 and M-5. These specific products have the following properties:

|  | EH-5 | H-5 | M-5 |
| --- | --- | --- | --- |
| Surface area m.²/g. (BET) | 390±40 | 325±25 | 200±25 |
| Particle size—micron | 0.007 | 0.007 | 0.012 |
| 325 Mesh residue—max. (%) | 0.02 | 0.02 | 0.02 |
| Density lbs./cu. ft. | 2.3 max. | 2.3 max. | 2.3 max. |
| Ignition loss (1,000° C. moisture-free basis) | 2.5% | 2% | 1% |
| pH (4% aqueous dispersion) | 3.5–4.2 | 3.5–4.2 | 3.5–4.2 |

Such specific silicas also all have the following properties: silica content—99.8 percent; bulking value, gallons per 100 lbs.—5.5; specific gravity—2.2; refractive index—1.46; X-ray structure—amorphous; and color—white. Other representative fumed silicas are the Aerosils, grades 200 and 380. These amorphous products have the following properties:

|  | 200 | 380 |
| --- | --- | --- |
| Surface area m.²/g. (BET) | 200±25 | 380±30 |
| Primary particle size (millimicrons) | Approx. 12 | Approx. 5 |
| Moisture content (105° C., 1 hr., %) | <1.5 | <1.5 |
| pH (4% aqueous suspension) | 3.6–4.3 | 3.6–4.3 |
| Bulk density (lbs./cu. ft.) | Approx. 2.5 | Approx. 2.5 |
| SiO₂%—moisture-free basis | >99.8 | >99.8 |

Hydrophobic silicas made by methylation of $SiO_2$ are also useful in the present invention. One such specific representative product is Aerosil R–972 which has the following properties: surface area m.²/g. (BET)—120±30; $SiO_2$+(—$CH_3$)—>99.8 percent; average particle size (millimicrons)—approx. 20; carbon content—1.2–1.6 percent which corresponds to approx. 0.8 millimol—$CH_3$ per 100 m.2; pH (4 percent dispersion in methanol/water 1:1)—3.6–4.0; ignition loss (1,100° C.)—0.7–1.0 percent; and bulk density—2–3 lbs./cu. ft. Representative of metal silicates which can be used are calcium silicates such as Micro-Cel A which has the following properties: surface area m.2/g.—95–200; bulk density—4–14 lbs./cu. ft.; particle size—less than 1 micron; color—white to gray; absorption—250–600 lbs./100 lbs. water.

The silicas and silicates preferably have an average particle size of less than about one micron. It is even more preferred that such products have average particle sizes in the range of about 5 to 15 millimicrons.

The various ingredients used in preparing the extrudable plastic mass can be mixed in any number of ways. However, to achieve the fullest benefits of my invention, it is necessary to intimately blend the silicas or silicates with the remaining ingredients and especially the proteinaceous source material, preferably using smearing or shearing actions. One preferred procedure is to first prepare a reasonably homogeneous mixture of the proteinaceous source material and the silica or silicate and then subject such mixture to shearing action by passage through differential rolls. It is also possible to combine all the ingredients and pass same through the differential rolls. Another variable is add the silica or silicate to one or more of the liquid ingredients and follow this by said shearing action. The other ingredients can then be added and the entire composition can be passed through the differential rolls one or more times. Other procedures to provide intimate mixing can also be used including pin milling of the dry ingredients, the use of blenders and the like.

After the initial mixing of the ingredients they are heated to temperatures sufficient to form the extrudable plastic mass and such temperatures are essentially maintained until the mass is extruded. The temperature is kept below the point where the mass, upon extrusion, would puff to any appreciable extent. Temperatures in the range of about 70° to 190° C. are preferred for the formation of the extrudable plastic mass and the subsequent extrusion.

The plastic mass can be formed and extruded in one operation by using an extruder equipped with means for mixing and heating the ingredients and a screw to continuously advance the forming mass to the extrusion orifice. In the examples which follow, a Brabender type 200 extruder was used. This extruder has three zones in which heat can be applied to the ingredient mixture. In the first zone, the first portion of the extruder barrel, the mixture is heated to a temperature lower than that of the succeeding zones, and between about 30° C. and 100° C. In the second zone, the second portion of the extruder barrel, the temperature during extrusion is maintained at between about 40° to about 190° C., and in the third zone, the extruder die, the temperature is about 70° to about 190° C. As indicated above, enough heat is needed to encourage thorough mixing, reacting and dispersing of the ingredients, but if the resulting plastic mass is too hot, flashing of the solvents or puffing may occur upon extrusion, resulting in voids, bubbles and/or weak spots in the films.

Ordinarily and preferably, the plastic mass is extruded into air or other gaseous medium at ambient room temperatures and at atmospheric pressure. Of course, sufficient pressure is applied to the hot plastic mass to force same through the extrusion die or orifice. In other respects, the extrusion pressure is not critical. Although no reason is seen for doing same, the extrusion of the plastic mass can be into air or other gaseous medium at pressures higher or lower than atmospheric pressure. Where such pressures are higher than atmospheric pressure, a somewhat higher mass or hot melt temperature than the preferred ranges set forth above may be accommodated without causing flashing of the solvent or puffing in the extruded film. However, even with such higher pressures, the temperature of the plastic mass should not be so high as to decompose or unduly degrade the protein or other ingredients of the mass or cause charring thereof. Extrusion into atmospheres having pressures lower than atmospheric pressure can also be used. However, while some reduction in the temperature could be made, the temperature still must be sufficient to yield the relatively homogeneous extrudable plastic mass. The medium into which the plastic mass is extruded is preferably and most practically maintained at ambient room temperature. However, higher or lower temperatures can be used if desired.

The plastic mass is extruded through a die which yields a film of the desired thickness. The film thickness is preferably below about 50 mils and down to as little as 0.1 mils. Where casings are desired, an annular die is employed instead of a ribbon die. Such die preferably yields a tube having an inner diameter of about 5 to 100 mm. and an initial wall thickness of about 0.25 to 50 mils prior to any desired lateral expansion of the tube. In this respect, the extruder can be equipped with a blower for air or other gas within the inner circumference of the annular die. Air or other gas may be blown into the tube as it is being extruded, and if the first emerging end (or some other subsequent area) of the tube is pinched together, the gas pressure thus created inside may be used to expand the freshly extruded tube to the desired diameter. The blower can be regulated as to gas flow and coordinated with the speed of extrusion to yield expanded tubes of reasonably uniform diameter. It is preferred that the tubes are expanded to about 1 to 10 times their initial diameter.

The films including casings dry quite rapidly even at ambient room temperatures and such drying can be accelerated somewhat if desired by using higher temperatures and moving air streams. The films and casings can be cut to any desired dimensions.

The following examples, which are not be considered as limiting, illustrate preferred embodiments of the invention.

EXAMPLE I

Trays of wheat gluten (Pro-80) 1 inch thick were autoclaved for five minutes at 121° C. Five hundred grams of the autoclaved gluten and 50 g. fumed silica (Cab-O-Sil, grade M-5) were dry blended and then mixed with a solution consisting of 160 ml. $H_2O$, 100 ml. 6 N NH4OH, 165 g. glycerol and 5 g. N $Na_2SO_3$. After mixing on a Hobart mixer to uniformly incorporate the ingredients, the mixture was passed over differential refining rolls with roll pressures of 200 lbs./in.$^2$ to break up aggregates. The resulting intimately mixed composition was formed into a plastic mass by the Brabender extruder operated at 85 r.p.m. and equipped with a 10 mil annular die having a diameter of one half inch. The temperatures in the three zones of the extruder were 90° C., 110° C. and 143° C., respectively. Continuous casings of high quality were obtained. Such casings could be expanded laterally and showed a substantial reduction in number of weak spots over a control run not containing silica. Additionally, the feed material was more readily handled and the extrusion rate could be increased over the control. Drying of the casings was also faster and the same showed reduced blocking after shirring and storage.

EXAMPLES II–IV

Example I was essentially repeated using the following formulations and conditions:

|  | Example II | Example III | Example IV |
|---|---|---|---|
| Ingredients (g.) |  |  |  |
| Wheat gluten | 1,000 | 1,000 | 1,000 |
| Water | 400 | 440 | 440 |
| 15 N NH$_4$OH | 80 | 80 | 80 |
| Na$_2$SO$_3$ | 10 | 10 | 10 |
| Glycerol | 330 | 330 | 330 |
| Silica (Cab-O-Sil) | (grade M–5)50 | (grade H–5)50 | (grade EH–5)50 |
| Extruder Diameter Die |  |  |  |
| Width (mils) | 10 | 10 | 10 |
| Diameter (in.) | 3/16 | 3/16 | 3/16 |
| Extruder Temp. °C. |  |  |  |
| Zone 1 | 90 | 90 | 90 |
| Zone 2 | 125 | 115 | 115 |
| Zone 3 | 156 | 161 | 159 |
| r.p.m. | 85 | 85 | 85 |

The ingredients were mixed in a Hobart mixer as in example I and then passed over the differential rolls operating at roll pressures of 250 lbs./in.2. The same good results were obtained as in example I. It is also to be noted that the uniformity of the casing was best in example IV using Cab-O-Sil EH-5 at a level of 5 percent by weight of the gluten.

EXAMPLE V

Example I was essentially repeated using synthetic calcium silicate (Micro-Cel A) at levels of 1, 3 and 5 percent by weight of the gluten (extruder operated at 103 r.p.m. and zone temperatures of 90° C.(1st), 140°–144° C.(2nd) and 143°–150° C. (3rd or at die). Results were improved as in example I over similar runs without the silicate. However, the silicate did not improve the overall extrusion to the same extent as the silica of example I–IV.

It is to understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. In the process of preparing a film wherein a relatively homogeneous, aqueous, extrudable, plastic mass is (1) formed by mixing and heating a composition consisting essentially of (a) a proteinaceous substance comprising at least about 50 percent of a particulate, nonheat coagulable simple protein material and (b) a liquid consisting essentially of water or water in combination with up to about 95 percent by volume of a monohydroxy alcohol of less than about 10 carbon atoms, wherein the protein to liquid weight ratio is in the range of abut 1:4 to 6:1, both the proteinaceous substance and the simple protein material have protein contents of at least about 65 percent by weight and the composition is heated to temperatures of at least about 70° C. but below the decomposition temperature of the protein contained therein, and the plastic mass is (2) extruded into a gaseous medium to form the film substantially free of voids, the improvement comprising adding from about 0.5 to 30 percent by weight based on the weight of the protein of an additive selected from particulate silicas and silicates to the composition prior to the formation of the plastic mass therefrom, such silicas and silicates having an average particle size of less than about 1 micron.

2. The process of claim 1 wherein the composition also contains an extrusion aid selected from reducing agents and bases or combinations thereof.

3. The process of claim 2 wherein the extrusion aid is a reducing agent and such reducing agent is present in an amount of about 0.1 to 5.0 percent by weight based on the weight of the protein in the composition.

4. The process of claim 3 wherein the reducing agent is sodium sulfite.

5. The process of claim 2 wherein the extrusion aid is a base and such base is present in an amount of about 0.1 to 45 percent by weight based on the weight of the protein in the composition.

6. The process of claim 5 wherein the base is ammonium hydroxide.

7. The process of claim 1 wherein the additive is fumed silica.

8. The process of claim 1 wherein all of the proteinaceous substance is the particulate, nonheat coagulate simple protein material.

9. The process of claim 8 wherein the protein material has a protein content of at least about 75 percent by weight.

10. The process of claim 9 wherein the protein material is wheat gluten.

11. The process of claim 1 wherein the composition also contains a plasticizer in an amount sufficient to increase the flexibility of the film.

12. The process of claim 11 wherein the plasticizer is glycerol and the same is present in an amount of up to about 50 percent by weight of the protein.

13. The process of claim 1 wherein the plastic mass is heated to temperatures in the range of about 70° to 190° C. prior to the extrusion thereof.

14. The process of claim 1 wherein the gaseous medium is air at ambient room temperature and atmospheric pressure.

15. The process of claim 1 wherein the plastic mass is extruded through an annular die to form a tube.

16. The process of claim 15 wherein the composition contains a reducing agent in an amount of about 0.1 to 5.0 percent, a water soluble base in an amount of about 0.1 to 45 percent by weight, and a plasticizer.

17. The process of claim 16 wherein the particulate, nonheat coagulable simple protein material is gluten, the liquid is water, the additive is a fumed silica having an average particle size of about 5 to 15 millimicrons, the reducing agent is sodium sulfite, the base is ammonium hydroxide and the plasticizer is glycerol.

18. The process of claim 17 wherein the tube has an inner diameter of about 5 to 100 mm. and a wall thickness of about 0.25 to 50 mils.

19. The process of claim 18 wherein the tube is expanded laterally to about 1 to 10 times the initial diameter thereof by introducing a gaseous medium into the inside of said tube under sufficient pressure to produce such expansion.

20. The film produced by the process of claim 1.

21. The tube produced by the process of claim 18.

22. The expanded tube produced by the process of claim 19.

* * * * *

PO-1050
(5/69)

UNITED STATES PATENT OFFICE
CERTIFICATE OF CORRECTION

Patent No. 3,615,715    Dated October 26, 1971

Inventor(s) Joseph D. Mullen

It is certified that error appears in the above-identified patent and that said Letters Patent are hereby corrected as shown below:

Column 1, line 54, after "including" insert -- liquid --; line 55, "in" should read -- is --. Column 3, line 63, "of" should read -- or --. Column 4, line 26, after "The" insert -- extrudable --, line 27, before "plasticizing" delete -- and --. Column 6, lines 35 and 38, "SiO2" should read -- $SiO_2$ --; lines 41 and 46, "m.2" should read -- $m.^2$ --. Column 7, line 74, after "not" insert -- to --. Column 8, line 7, "NH4OH" should read -- $NH_4OH$ --; line 8, "5 g. N Na2SO3" should read -- 5 g. $Na_2SO_3$ -- line 34, "400" should read -- 440 --; line 39, "Extruder Diameter Die" should read -- Extruder Conditions --; Column 9, line 1,
                                                                Die
after "percent" insert -- by weight --; line 6, "abut" should read -- about --.

Signed and sealed this 18th day of April 1972.

(SEAL)
Attest:

EDWARD M.FLETCHER,JR.         ROBERT GOTTSCHALK
Attesting Officer              Commissioner of Patents